United States Patent [19]

Schweiss et al.

[11] Patent Number: 4,818,377
[45] Date of Patent: Apr. 4, 1989

[54] DEFROTHING METHOD AND APPARATUS

[75] Inventors: Peter Schweiss, Langenau; Hans-Dieter Dorflinger, Heidenheim, both of Fed. Rep. of Germany

[73] Assignee: J.M. Voith GmbH, Heidenheim, Fed. Rep. of Germany

[21] Appl. No.: 110,931

[22] Filed: Oct. 21, 1987

[30] Foreign Application Priority Data

Oct. 21, 1986 [DE] Fed. Rep. of Germany ....... 3635713

[51] Int. Cl.$^4$ .......................... B03D 1/10; B10D 19/02
[52] U.S. Cl. ...................................... 209/164; 209/10; 209/168; 210/188; 210/221.1; 210/703; 210/788; 55/87; 55/178
[58] Field of Search ............... 209/164, 168, 169, 170, 209/3, 10; 55/87, 178; 210/188, 218, 221.1, 221.2, 788, 703, 197, 805; 252/321

[56] References Cited

U.S. PATENT DOCUMENTS

| 2,765,867 | 10/1956 | Revaller | 55/178 |
| 3,669,883 | 6/1972 | Huckstedt | 210/221 |
| 4,475,932 | 10/1984 | Hull | 210/188 |
| 4,708,793 | 11/1987 | Cathriner | 210/188 |

FOREIGN PATENT DOCUMENTS

| 441026 | 4/1971 | U.S.S.R. | 55/87 |
| 844062 | 8/1981 | U.S.S.R. | 55/178 |
| 865326 | 9/1981 | U.S.S.R. | 55/178 |
| 1031453 | 7/1983 | U.S.S.R. | 55/178 |
| 1031452 | 7/1983 | U.S.S.R. | 55/178 |

Primary Examiner—David L. Lacey
Assistant Examiner—Thomas M. Lithgow
Attorney, Agent, or Firm—Albert L. Jeffers; Richard L. Robinson

[57] ABSTRACT

A defrothing apparatus whose inlet opening of the foamed liquid contained in a foam duct of a primary flotation apparatus is provided in the bottom of the foam duct. Starting from the lower area of the defrothing apparatus, a rotary flow (potential vortex) is generated in the apparatus by a recirculated lqiuid quantity from a secondary flotation apparatus. In the core of the rotary flow the gas quantity (air) is collected and removed through a removal pipe. Consequently, the foamed liquid from the foam duct of the primary flotation stage which is pumped to the secondary flotation stage contains small shares of gas relative to the total quantity of liquid, thereby allowing the pump to be optimally sized of efficiency and better control of the system.

15 Claims, 3 Drawing Sheets

DEFROTHING METHOD AND APPARATUS

BACKGROUND OF THE INVENTION

The invention concerns a method and apparatus for defrothing and degassing liquid flowing from the foam duct of a primary flotation cell to a subsequent secondary flotation cell.

An existing difficulty involves the constant feeding of the foam which generally collects in a foam duct in the primary flotation cell arrangement to a pump which feeds the liquid quantity of the foam to the secondary flotation stages. A very large share of air in the foam might call for a generous overdimensioning of the pump, but this is relatively expensive and for operational cases occurring now and then, when said liquid quantity contains only a small share of gas, the control could very easily be thrown off balance because the pump would then feed too much liquid.

As is known, the liquid cleaned in the secondary flotation stage is recycled to the primary flotation stage. This is where the invention sets in solving the problem of enabling a smooth operation of the pump without overdimensioning it through the features described and claimed herein with reference to specific preferred embodiments.

BRIEF DESCRIPTION OF THE DRAWINGS

The invention will be illustrated hereafter with the aid of two embodiments shown in the drawing.

FIG. 1b is a plan view of the defrothing apparatus of FIG. 1a;

FIG. 1c is a cross-sectional view of a side elevation of the defrothing apparatus of FIG. 1a;

FIG. 3b is a plan view of the defrothing apparatus of FIG. 3a.

DESCRIPTION OF THE PREFERRED EMBODIMENTS

Figure 1A:
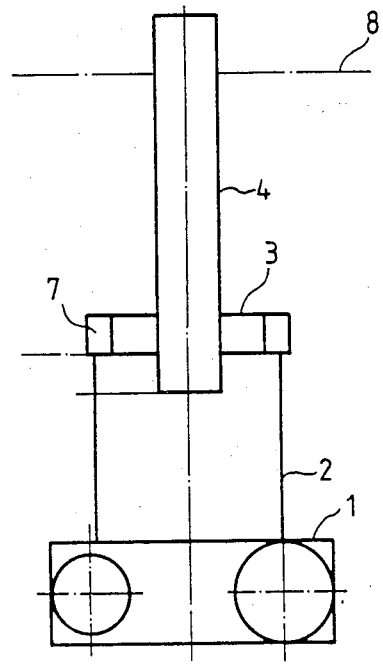
FIG. 1a is an elevational view of a defrothing apparatus in accordance with the invention.
Figure 1C:
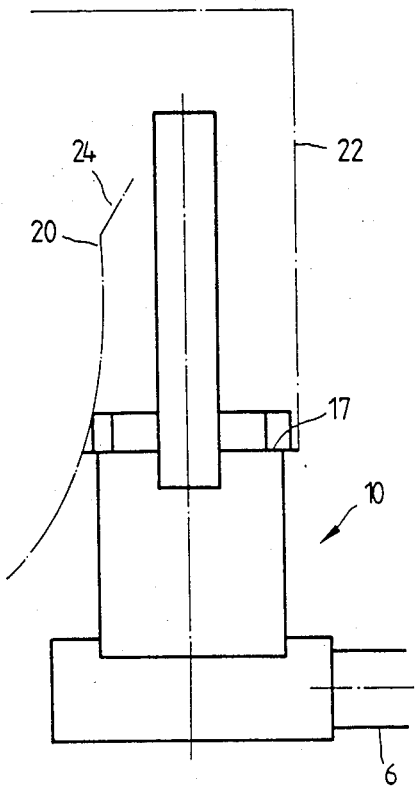
Figure 1B:
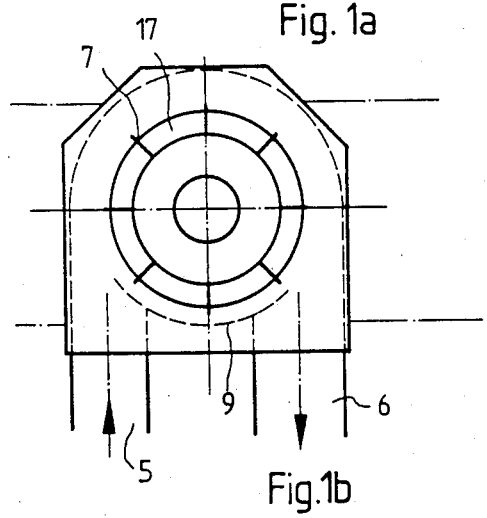

Referring to FIGS. 1a-1c, one embodiment of the inventional apparatus is marked 10. The liquid inlet socket of the apparatus 10 is marked 5 while the drain socket is marked 6. They are arranged parallel and are located on the same side of the base 1, and at that, on its edges so that both the influx and removal of the liquid occur tangentially. The base 1 is upwardly followed by the concentric middle section 2, the radius of which is at least 20% smaller than that of the circular cylinder shaped wall section 11 of the base 1 which is opposite the inlet and drain sockets. The ratio of the height of the middle section 2 to its diameter is at least about 0.8:1. The ratio of the diameter of the middle section 2 to the diameter of circular cylinder shaped wall section 11 is preferably between 0.6 and 0.8. A baffle wall 9 in the shape of a circular cylinder section is disposed in base 1 and extends between inlet socket 5 and outlet socket 6 and the center axes thereof. A cup-shaped cover part 3 upwardly follows the middle section 2 and forms with the top edge of the middle section 2 an influx area 17 which is ring-shaped in cross-section, for entrance of the foamed liquid into section 2. Extending downwardly through the cup-shaped cover part 3 and into the upper part of the middle section 2 is the gas removal pipe 4. Pipe 4 also extends upwardly preferably beyond the overflow edge 8 of the foam removal weir 24 illustrated by dash-dot lines, but preferably ends still within the foam duct 22, which is indicated by dash-dot lines as well. One defining wall of said foam duct is the side wall of the flotation cell setup 20 of the primary stage (illustrated as well by dash-dot lines). The diameter of the gas removal pipe 4 is preferably at least 60% smaller than the diameter of the middle section 2. Moreover, the middle section 2 extends downwardly preferably a short way (about 20% of the height of base 1) into the base 1. Radial ribs 7 originating from the outer rim of cup-shaped cover part 3 fix cover part 3 including central gas removal pipe 4 to the top portion of middle section 2, which is at the bottom of foam duct 22.

Figure 2:
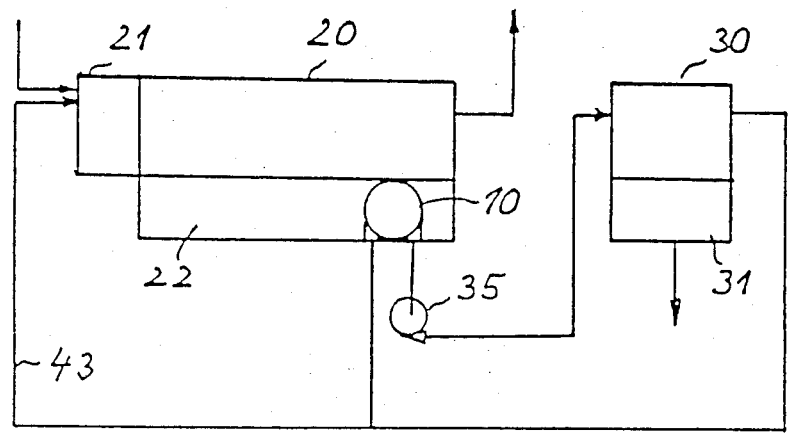
FIG. 2 is a plan view, in schematic form, of the defrothing apparatus of FIG. 1a in combination with primary and secondary flotation cells and related interconnections.

FIG. 2 illustrates the arrangement of the apparatus 10 in the foam duct 22 of the primary flotation cell setup 20 with entrance area 21. The pump 35 transfers a part of the cleaned recirculated liquid quantity, which was removed from the secondary flotation cell setup 30 featuring the foam duct 31, into the apparatus 10; the other part proceeds through the line 43 into the entrance part 21 of the primary flotation cell setup 20.

The recirculated liquid quantity introduced in the entrance socket 5 generates in the base 1 a rotary flow having essentially the shape of a potential vortex that propagates also into the middle section 2, thus entraining also the foamed liquid quantity of the foam removal duct 22, whereby the gas (air) contained in the foamed liquid is caused to collect centrally and can be removed through the gas removal pipe 4.

Important for the proper functioning of the method and apparatus is a low loss of pressure in the apparatus, since between the bottom of the foam duct 22 and the inlet socket of the pump 35 there exists only a slight difference in level. But this condition, as tests have demonstrated, is met very well in this apparatus. The cross-section of the drain socket 6 is preferably chosen somewhat larger than that of the inlet socket 5, since a quantity greater than that introduced needs to be removed.

The recirculated quantity passing through the apparatus 10 is preferably 60–85% of the total recirculation quantity, so that the line 43 carries only the smaller remainder to the entrance part 21 of the primary flotation cell setup, figuring a reduction of about 3% due to flotation sludge.

Figure 3A:
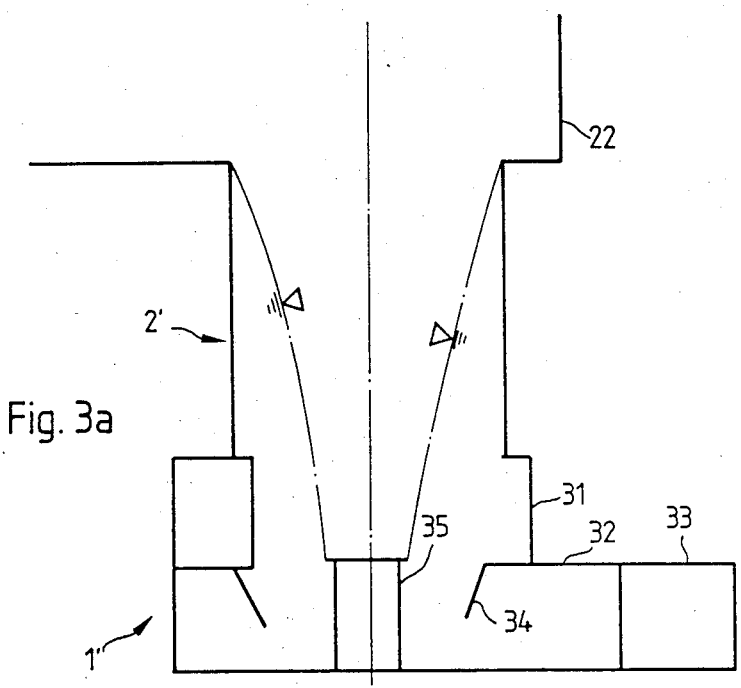
FIG. 3a is a cross-sectional view of an alternative embodiment of a defrothing apparatus in accordance with the invention.
Figure 3B:
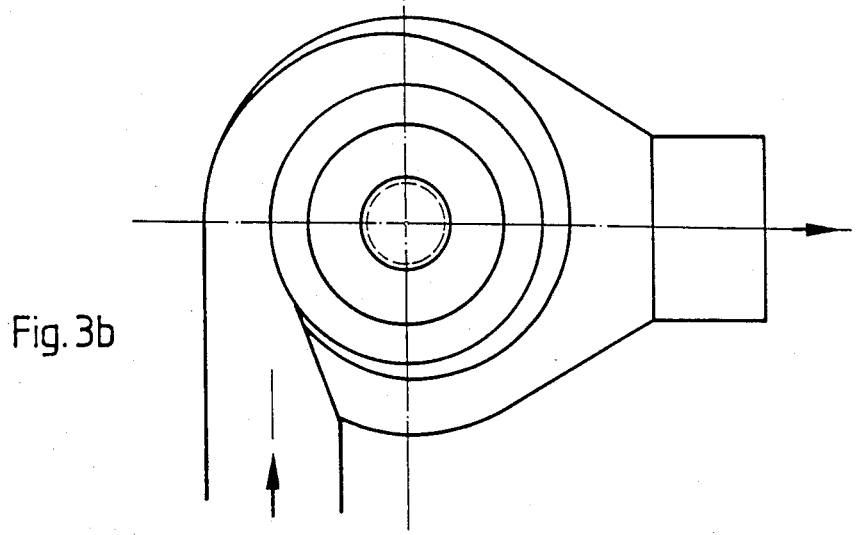

FIGS. 3a and 3b depict another embodiment of the degassing apparatus in which a top part 2' corresponds to the middle section 2 of FIGS. 1a through 1c. The base 1' is split in two superposed parts. Those components of the apparatus illustrated in FIGS. 3a and 3b which are analogous to components of FIGS. 1a through 1c are designated by corresponding numerals, but with a prime suffixed.

The upper part 31 of the base 1' is fashioned as an inlet spiral, as can be seen from FIG. 3b, for the suspension quantity carried in the bypass. The entrance area of the bottom part 32 features a downwardly tapered funnel 34, with the inclination of the generatrix thereof being in the range of about 10° to 20° with respect to vertical. Centrally, the bottom part 32 has a guide cylinder 35 whose diameter ranges from 0.2 to 0.3 times the diameter of the inlet opening of the funnel 34. The inlet cylinder extends up into the area of the inlet opening of the bottom part 32. Centrally, the bottom part 32 features an outlet channel 33 through which the degassed liquid proceeds to a transfer pump. The height ratio between the top part (inlet spiral) 31 and the bottom part 32 of the base 1' ranges between 0.8:1 and 1.2:1. The ratio of the height of the top part 2' to its diameter is at least about 0.8:1.

What is claimed is:

1. In a system having an apparatus for defrothing and degassing the liquid foam flowing from the foam duct of a primary flotation cell to a subsequent secondary flotation cell, with liquid from the secondary flotation cell being recycled to the primary flotation cell, said apparatus comprising:
   a base with an inlet socket and an outlet socket in flow communication with each other, said base having a wall opposite the inlet and outlet sockets shaped as a circular cylinder section, the inlet and outlet sockets being disposed tangentially with respect to the wall;
   a cylindrical middle section disposed upwardly of and connected in flow communication with said base, the radius of said middle section being less than the radius of the wall of said base, said middle section having inlet means for receiving foam;
   means for communicating foam from the foam duct of the primary flotation cell to the inlet means of said middle section; and
   means for communicating at least a portion of the recycled liquid to the inlet socket of said base.

2. System according to claim 1, and said apparatus further including a central gas removal pipe and means for supporting the gas removal pipe so as to extend through the upper part of the middle section.

3. System according to claim 1, in which the inlet means includes a cup-shaped cover part disposed upwardly of the middle section and being supported by the top edge of the middle section, said cover part having an influx area which is ring-shaped in cross-section, for entrance of said foam.

4. System according to claim 2, in which the inlet means includes a cup-shaped cover part disposed upwardly of the middle section and being supported by the top edge of the middle section, said cover part having an influx area which is ring-shaped in cross-section, for entrance of said foam.

5. System according to claim 2, and said apparatus further including a baffle wall in the shape of a circular cylindrical section disposed in said base and extending between the inlet socket and the outlet socket and the center axes thereof.

6. System according to claim 3, and said apparatus further including a baffle wall in the shape of a circular cylindrical section disposed in said base and extending between the inlet socket and the outlet socket and the center axes thereof.

7. System according to claim 5, and wherein said means for supporting said gas removal pipe comprises radial ribs originating from an outer rim of a cup-shaped cover part and extending to said middle section, the cover part being disposed upwardly of the middle section and being supported by the top edge of the middle section.

8. System according to claim 1, in which the difference of the radii of the middle section and circular cylindrical shaped wall of the base amounts to at least 20% of the radius of the middle section.

9. System according to claim 1, in which the height of the middle section is at least about 0.8 times its diameter.

10. In a system having an apparatus for defrothing and degassing the liquid foam flowing from the foam duct of a primary flotation cell to a subsequent secondary flotation cell, with liquid from the secondary flotation cell being recycled to the primary flotation cell, said apparatus comprising:
    a base with an inlet socket and an outlet socket, said base being subdivided in two superposed top and bottom parts, the top part having an outside wall defining an inlet spiral communicating with the inlet socket, the bottom part communicating with the outlet socket, and the base having an opening between said top and bottom parts to define a flow communication therebetween;
    a cylindrical top section disposed upwardly of and connected in flow communication with the top part of said base, said top section having inlet means for receiving foam;
    means for communicating foam from the foam duct of the primary flotation cell to the inlet means of said top section; and
    means for communicating at least a portion of the recycled liquid to the inlet socket of said base.

11. Apparatus according to claim 10, in which the bottom part includes a downwardly tapered funnel defining an entrance area in communication with the inlet spiral of the top part, the inclination of the generatrix of the funnel being in the range of about 10° to 20° with respect to vertical.

12. Apparatus according to claim 11, and further including a central guide cylinder in the bottom part of the base which extends concentrically up into the funnel and has a diameter in the range of about 0.2 to 0.3 times the diameter of the entrance area of the bottom part.

13. A defrothing system, comprising:
    a primary flotation cell having a foam outlet duct;
    a secondary flotation cell having a liquid outlet;
    a defrothing apparatus configured as a hollow body with substantially cylindrical walls in several sections including:
    a base with an inlet socket and an outlet socket, each in flow communication with and disposed tangentially to said base;
    a middle section disposed upwardly of and connected in flow communication with said base, the top portion of said middle section being connected in flow communication with the bottom of the foam outlet duct; and
    line means for communicating the liquid outlet of said secondary flotation cell to the inlet socket of said base.

14. Method for defrothing and degassing the liquid foam flowing from the foam duct of a primary flotation cell to a subsequent secondary flotation cell, comprising the steps of
    (1) using recycled liquid from the secondary cell to create a potential vortex rotary flow in an apparatus which is rotationally symmetric in its effective area, by tangential introduction of said recycled liquid into the base of said apparatus and exit of said recycled liquid from said apparatus; and
    (2) introducing the liquid foam to be defrothed and degassed into contact with the rotary flow in the upper area of said apparatus;
    whereby the liquid portion of the foam is incorporated into the recycled liquid and the gas portion of the foam is removed at the air-to-liquid interface of the potential vortex rotary flow.

15. Method according to claim 14, in that the liquid foam to be defrothed and degassed is introduced into the rotary flow at the bottom of the foam duct.

* * * * *